United States Patent
Laredo

(10) Patent No.: US 9,519,786 B1
(45) Date of Patent: Dec. 13, 2016

(54) FIRMWARE INTEGRITY ENSURANCE AND UPDATE

(71) Applicant: Google Inc., Mountain View, CA (US)

(72) Inventor: Nathan Isaac Laredo, Mountain View, CA (US)

(73) Assignee: Google Inc., Mountain View, CA (US)

( * ) Notice: Subject to any disclaimer, the term of this patent is extended or adjusted under 35 U.S.C. 154(b) by 82 days.

(21) Appl. No.: 14/034,795

(22) Filed: Sep. 24, 2013

Related U.S. Application Data

(60) Provisional application No. 61/710,180, filed on Oct. 5, 2012.

(51) Int. Cl.
*G06F 9/44* (2006.01)
*G06F 21/57* (2013.01)
*G06F 9/445* (2006.01)

(52) U.S. Cl.
CPC ............ *G06F 21/575* (2013.01); *G06F 8/665* (2013.01)

(58) Field of Classification Search
None
See application file for complete search history.

(56) References Cited

U.S. PATENT DOCUMENTS

| | | | | |
|---|---|---|---|---|
| 5,623,604 A * | 4/1997 | Russell et al. | ................ | 717/167 |
| 5,815,722 A * | 9/1998 | Kalwitz et al. | ................ | 717/178 |
| 7,318,151 B1 * | 1/2008 | Harris | ................ | 713/2 |
| 7,480,907 B1 * | 1/2009 | Marolia et al. | ................ | 717/174 |
| 8,429,643 B2 * | 4/2013 | Venkatachalam et al. | ... | 717/173 |
| 2004/0030877 A1 * | 2/2004 | Frid | ................ | 713/1 |
| 2006/0143600 A1 * | 6/2006 | Cottrell et al. | ................ | 717/168 |
| 2006/0174109 A1 * | 8/2006 | Flynn | ................ | 713/164 |
| 2009/0172639 A1 * | 7/2009 | Natu et al. | ................ | 717/120 |
| 2012/0072734 A1 * | 3/2012 | Wishman et al. | ................ | 713/189 |
| 2012/0167205 A1 * | 6/2012 | Ghetie et al. | ................ | 726/22 |
| 2013/0185563 A1 * | 7/2013 | Djabarov et al. | ............. | 713/176 |

* cited by examiner

*Primary Examiner* — Jason Mitchell
(74) *Attorney, Agent, or Firm* — Lerner, David, Littenberg, Krumholz & Mentlik, LLP

(57) ABSTRACT

A client device includes a flash chip for storing firmware and a microcontroller for storing an image in read-only memory. The image corresponds to an accurate representation of firmware. When the client device is powered on but before the firmware is executed to boot the client device, the firmware stored on the flash chip is compared to the image. In the event that the firmware does not correspond to the image, the client device is not booted and the firmware is overwritten with the image. The client device may then be booted using the flashed firmware. To update the firmware, the client device may receive a new image from a server. The new image is stored in the read-only memory of the microcontroller. The firmware may then be re-flashed using the new image.

8 Claims, 5 Drawing Sheets

FIRMWARE INTEGRITY ENSURANCE AND UPDATE

CROSS-REFERENCE TO RELATED APPLICATION

The present application claims the benefit of the filing date of U.S. Provisional Patent Application No. 61/710,180 filed Oct. 5, 2012, the entire disclosure of which is hereby incorporated herein by reference.

BACKGROUND

The disclosure relates generally to ensuring firmware integrity before a system is booted and to updating firmware.

The first code fetched and executed from a device on power on is commonly referred to as firmware. It's job in a PC may include initializing the CPU, memory, video, keyboard, mouse, hard disk drive, and/or other hardware. It then typically checks each configured bootable device, like the hard disk or USB storage, and loads and executes that software according to a preconfigured boot priority, giving it control of the PC. This process is commonly known as "booting" and is not strictly limited to the PC category of computing devices.

Firmware is usually stored in non-volatile memory on a motherboard. One example of such memory is commonly referred to as "flash" memory. The firmware is specifically designed to work with each particular model of computer, interfacing with various devices that make up the complementary chipset of the system. In modern computer systems, the non-volatile memory's contents can be rewritten without removing it from the motherboard, allowing firmware to be upgraded in place. Hardware manufacturers frequently issue firmware updates to upgrade their products, improve compatibility, and remove bugs.

Since the firmware is stored in rewritable memory, the contents may be replaced or rewritten, sometimes termed "flashing." Flashing may be performed by a special program, usually provided by the system's manufacturer, with a firmware image in a hard drive or a USB flash drive. A file containing such contents may be referred to as "a firmware image." For example, firmware may be flashed by storing a firmware image on a root of a USB drive and then booting the system. Firmware may be subsequently re-flashed to upgrade to a newer version to fix bugs, to improve performance, or to support new hardware. In some cases, a re-flashing operation may be performed to fix damaged firmware.

Flash memory devices are advantageous for storing firmware because these devices may be easily updated by a user. However, an improperly executed or aborted firmware update may render a computer unusable. To avoid these situations, recent firmware design includes a "boot block" which is a portion of the firmware that runs first and is updated separately from the rest of the firmware. The boot block code verifies if the rest of the firmware is intact using hash checksums or other methods before transferring control of the firmware. If the boot block detects any corruption in the main firmware, the user is warned that a recovery process should be initiated by booting from removable media so that the user may re-flash the firmware. In some cases, the software that verifies the integrity of flash contents may be compromised to report known good cryptographic hashes of firmware while malicious firmware continues to execute. Systems with mis-programmed flash devices or erased flash devices effectively become useless without manual intervention.

SUMMARY

Aspects of the disclosure are directed to preventing the execution of firmware that may have been improperly tampered with. The integrity of the firmware may be ensured and the firmware may be updated with a version that corresponds to an accurate, current software representation. A client device is provided with a flash chip that includes the firmware. The client device may be any type of computing device such as a mobile computing device or a personal computer. The client device includes a microcontroller that has access to either an additional out-of-band copy of the firmware image or the means to verify the existing firmware image through some other means, such as a cryptographic hash, prior to allowing the client device to boot, and has the means to correct the firmware image that the client device uses prior to permitting the client device to boot up using that firmware.

The firmware image private to the microcontroller corresponds to a known good image or may contain information used to verify a cryptographic signature on the client device firmware. Before the firmware is executed to boot the client device, the microcontroller communicates with the flash chip to determine if the firmware stored on the flash chip is an accurate representation of the boot software for the client device. In the event that the firmware stored on the flash chip does not correspond to the image stored on the microcontroller, the client device is not booted. The microcontroller may correct the firmware by flashing the reference image over the existing image if it differs. After the firmware is flashed, the client device may be booted.

To update the firmware, a new image may be uploaded to a server. The new image includes the updates to be loaded to the flash chip on the client device. The client device may initiate the firmware update by requesting the update from the server. The server authenticates the request and outputs the new image to the client device over a network. The microcontroller on the client device authenticates the new image. The authenticated, new image is stored in memory of the microcontroller such that the previously stored image is overwritten with the updated image. The firmware may then be re-flashed by providing the contents of the new image on the bus and overwriting the firmware stored on the flash chip. The update image may also be checked in the same way as the local image, and rejected if it does not comply with similar checks, which may also include signed updates of the known good hashes stored in the microcontroller.

In some aspects, a computer-implemented method for ensuring firmware integrity includes receiving input to provide power to a computing device. A firmware image stored in read-only memory is compared to firmware stored on a flash chip. In the event that the image does not correspond to the firmware, the firmware is flashed using the image. The computing device is then booted using the flashed firmware.

In some aspects, a computer-implemented method for updating firmware includes generating an image update request using a private key associated with a client device. The image update request is sent to a server, and a new image is received from the server. An image stored on the client device is replaced with the new image received from the server. A flash chip including firmware is flashed using the new image such that the firmware is updated.

In some aspects, a system for ensuring firmware integrity includes a flash chip for storing firmware, a microcontroller for storing a image in read-only memory, a bus for communicatively coupling the flash chip to the microcontroller, and a processor. The processor is configured to: receive input to provide power to a computing device; compare the image to the firmware; in the event that the image does not correspond to the firmware, flash the firmware using the image; and boot the computing device using the flashed firmware.

In some aspects, a system for ensuring firmware integrity includes a flash chip for storing firmware, a microcontroller for storing an image in read-only memory, a bus for communicatively coupling the flash chip to the microcontroller, and a processor. The processor is configured to: send an image update request to a server; receive a new image from the server; replace the image stored in the read-only memory with the new image; and flash the flash chip using the new image such that the firmware is updated.

DETAILED DESCRIPTION

The aspects, features and advantages of the present disclosure will be appreciated when considered with reference to the following description of preferred implementations and accompanying figures. The following description does not limit the disclosure; rather, the scope is defined by the appended claims and equivalents.

While certain processes in accordance with example implementations are shown in the figures as occurring in a linear fashion, this is not a requirement unless expressly stated herein. Different processes may be performed in a different order or concurrently.

The disclosure describes systems and methods for ensuring firmware integrity. A client device includes a microcontroller that stores an image in read-only memory such that the image cannot be tampered with. The image corresponds to a version of the firmware that is known to be an accurate representation.

The firmware is stored on a flash chip provided in the client device. When the client device is powered on but before the firmware is executed to boot the client device, the microcontroller communicates with the flash chip via a bus to determine if the firmware stored on the flash chip is an accurate representation of the boot software for the client device. In the event that the firmware stored on the flash chip does not correspond to the image stored on the microcontroller, the client device is not booted and the firmware is overwritten with the image. After the firmware is flashed with the image, the client device may be booted.

The disclosure also describes systems and methods for updating firmware. The client device may receive a new image from a server in response to a request to update the firmware. The new image is stored in the read-only memory of the microcontroller of the client device such that the previously stored image is overwritten with the updated firmware. The firmware on the flash chip may then be re-flashed using the new image.

Figure 1:
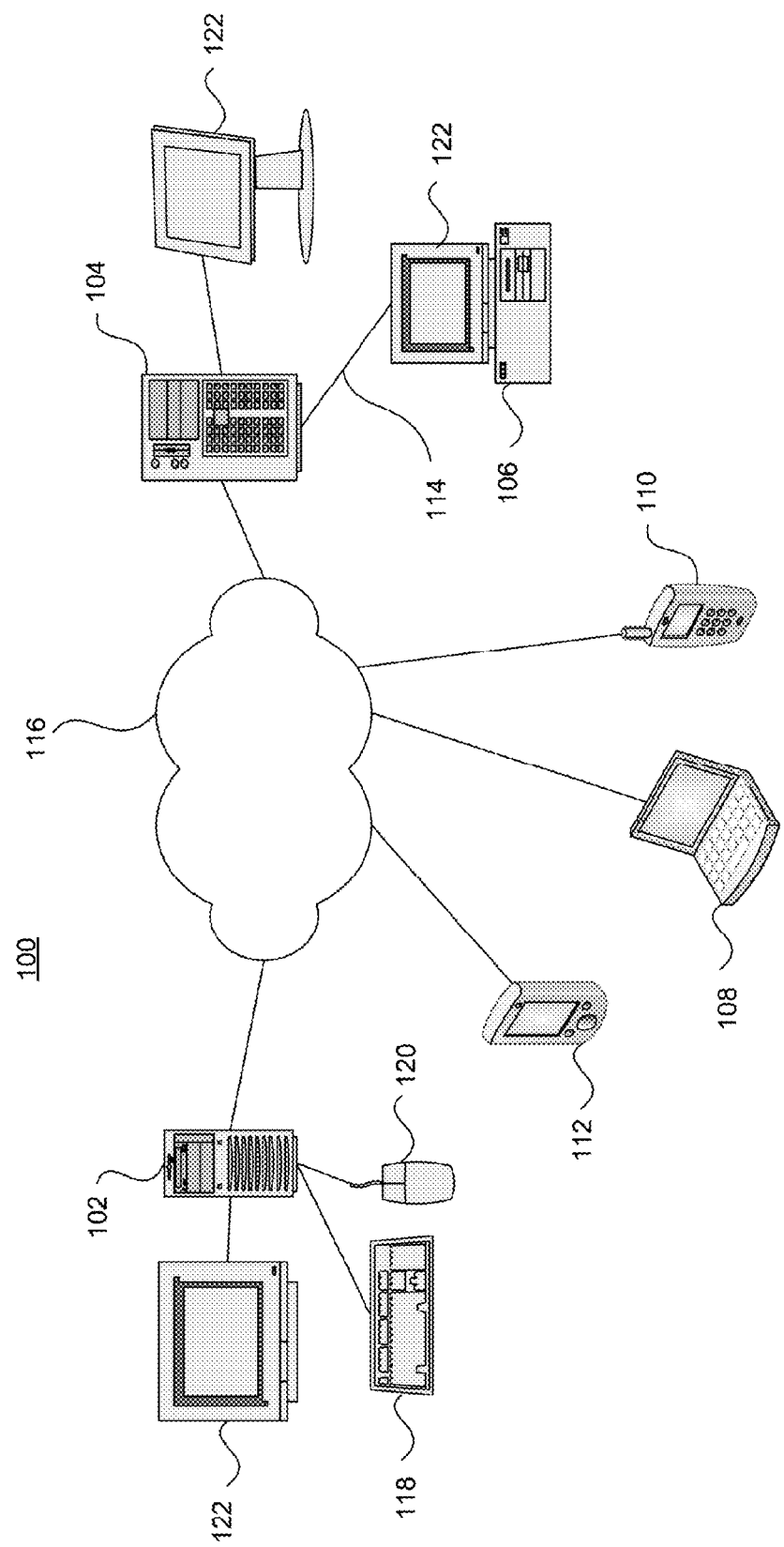
FIG. 1 illustrates a system in accordance with example implementations.

FIG. 1 presents a schematic diagram of a computer system depicting various computing devices that can be used alone or in a networked configuration in accordance with aspects of the disclosure. For example, FIG. 1 illustrates a computer network 100 having a plurality of computers 102, 104, 106, 108 as well as other types of devices such as a mobile phone 110 and a PDA 112. Such devices may be interconnected using a local or direct connection 114 and/or may be coupled using a network 116 such as a LAN, WAN, the Internet, etc., which may be wired or wireless.

Each device may include, for example, one or more processing devices and have user inputs such as a keyboard 118 and mouse 120 and/or various other types of input devices such as pen-inputs, joysticks, buttons, touch screens, etc., as well as a display 122, which could include, for instance, a CRT, LCD, plasma screen monitor, TV, projector, etc. Each computer 102, 104, 106, 108 may be a personal computer, server, etc. By way of example only, computers 102, 106 may be personal computers while computer 104 may be a server and computer 108 may be a laptop.

Figure 2:
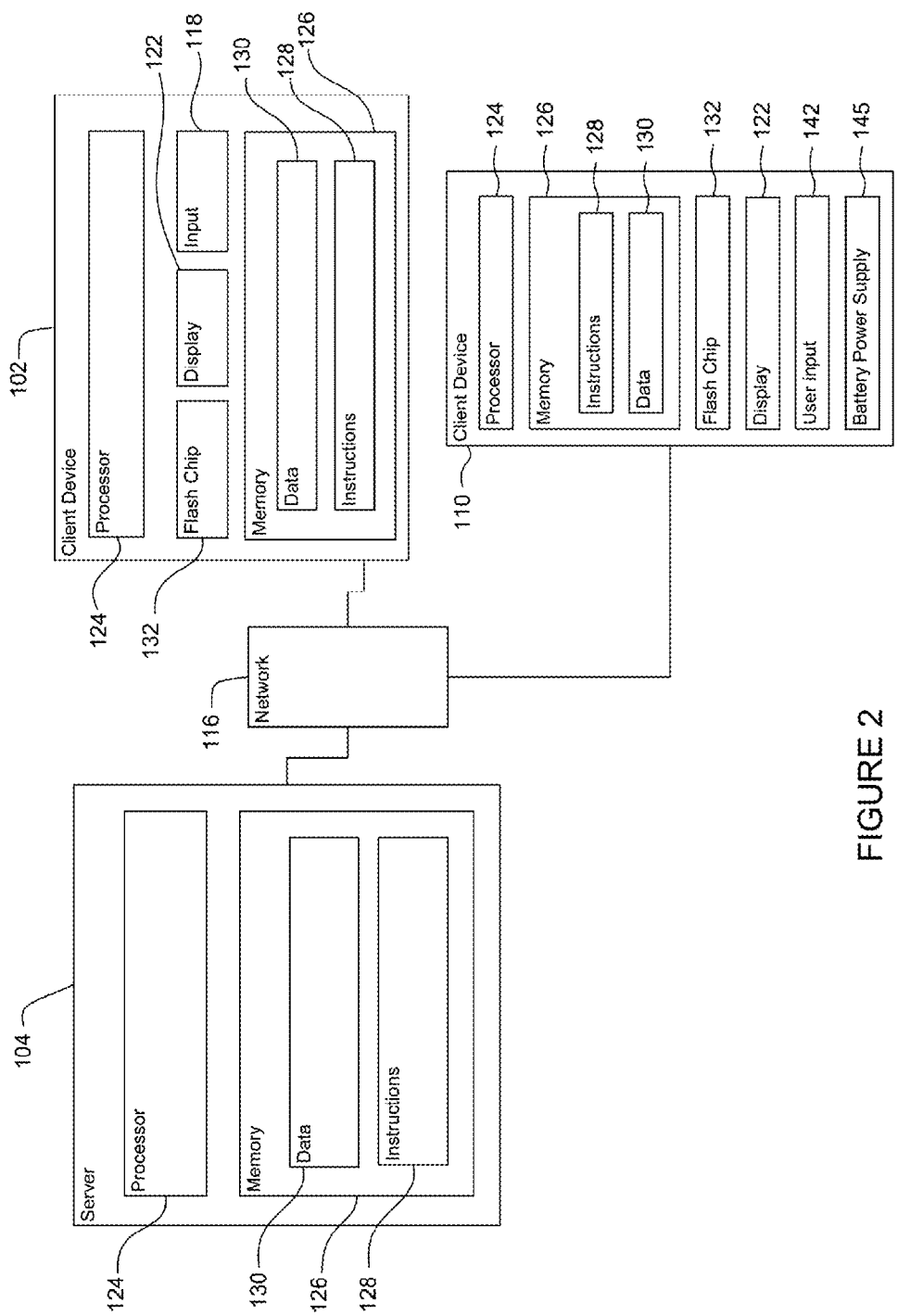
FIG. 2 illustrates aspects of the system of FIG. 1.

As shown in FIG. 2, each computer, such as server 104 and client devices 102, 110, contains a processor 124, memory/storage 126 and other components typically present in a computer. For instance, memory/storage 126 stores information accessible by processor 124, including instructions 128 that may be executed by the processor 124 and data 130 that may be retrieved, manipulated or stored by the processor 124. The memory/storage 126 may be of any type or any device capable of storing information accessible by the processor 124, including a computer-readable medium, or other medium that stores data that may be read with the aid of an electronic device, such as a hard-drive, memory card, ROM, RAM, CD-ROM or other optical disks, flash memories, write-capable or read-only memories. In that regard, memory/storage 126 may include short term or temporary storage as well as long term or persistent storage. Systems and methods may include different combinations of the foregoing, whereby different portions of the instructions 128 and data 130 are stored on different types of media.

The processor 124 may comprise any number of well known processors, such as a CPU. Alternatively, the processor may be a dedicated controller for executing operations, such as an ASIC. Although FIG. 2 functionally illustrates the processor 124 and memory 126 as being within the same block, the processor 124 and memory 126 may actually comprise multiple processors and memories that may or may not be stored within the same physical housing. For example, the processor 124 may comprise a collection of processors which may or may not operate in parallel, and memory 126 may be a hard drive or other storage media located in a server farm of a data center. Some or all of the instructions 128 and data 130 may be stored in a location physically remote from, yet still accessible by, the processor 124. For example, data 130 may be distributed and stored across multiple memories 126 such as hard drives or the like. Accordingly, references to a processor, a computer or a memory will be understood to include references to a collection of processors or computers or memories that may or may not operate in parallel.

The instructions 128 may include any set of instructions to be executed directly (such as machine code) or indirectly (such as scripts) by the processor(s). For example, the instructions may be stored as computer code on the computer-readable medium. In that regard, the terms "instructions," "steps" and "programs" may be used interchangeably herein. The instructions 128 may be stored in any computer language or format, such as in object code or modules of source code. The functions, methods and routines of the instructions 128 are described in detail below.

Data 130 may be retrieved, stored or modified by processor 124 in accordance with the instructions 128. The data 130 may be stored as a collection of data. The data 130 may also be formatted in any computer readable format such as, but not limited to, binary values, ASCII or Unicode. Similarly, the data may include images stored in a variety of formats such as vector-based images or bitmap images using lossless (e.g., PNG) or lossy (e.g., JPEG) encoding. Moreover, the data 130 may include any information sufficient to identify the relevant information, such as descriptive text, proprietary codes, pointers, references to data stored in other memories (including other network locations) or information which is used by a function to calculate the relevant data.

As described in detail below, the client devices 102, 110 may each include a flash chip 132 configured to store firmware that is executed to boot the client devices 102, 110 when power is provided to the devices 102, 110.

Although the client devices 102, 110 may each comprise a full-sized personal computer, they may alternatively comprise mobile computing devices capable of wirelessly exchanging data. By way of example only, client device 110 may be a wireless-enabled PDA or a cellular phone capable of obtaining information via the Internet. The client device 110 may have all of the components normally used in connection with a mobile computing device such as processor 124, memory 126, instructions 128 and data 130, as described above. The client device 110 may include an electronic display 122 (e.g., a monitor having a screen, a touch-screen, a projector, a television, a computer printer or any other electrical device that is operable to display information), and user input 142 (e.g., a mouse, keyboard, touch-screen or microphone). The client device 110 may also include an accelerometer, speakers, a network interface device, a battery power supply 145 or other power source, and all of the components used for connecting these elements to one another.

The computer 104 and other devices are capable of direct and indirect communication with other computers, such as over network 116. Although only a few computing devices are depicted in FIGS. 1 and 2, it should be appreciated that a typical system can include a large number of connected servers and clients, with each different computer being at a different node of the network. The network 116, and intervening nodes, may comprise various configurations and protocols including the Internet, intranets, virtual private networks, wide area networks, local networks, private networks using communication protocols proprietary to one or more companies, Ethernet, WiFi, Bluetooth or TCP/IP.

Communication across the network 116, including any intervening nodes, may be facilitated by any device capable of transmitting data to and from other computers, such as modems, e.g., dial-up or cable, network interfaces and wireless interfaces. Although certain advantages are obtained when information is transmitted or received as noted above, other aspects are not limited to any particular manner of transmission of information. For example, in some aspects, the information may be sent using a medium such as a disk, tape, CD-ROM, or directly between two computer systems using a dial-up modem.

Figure 3:
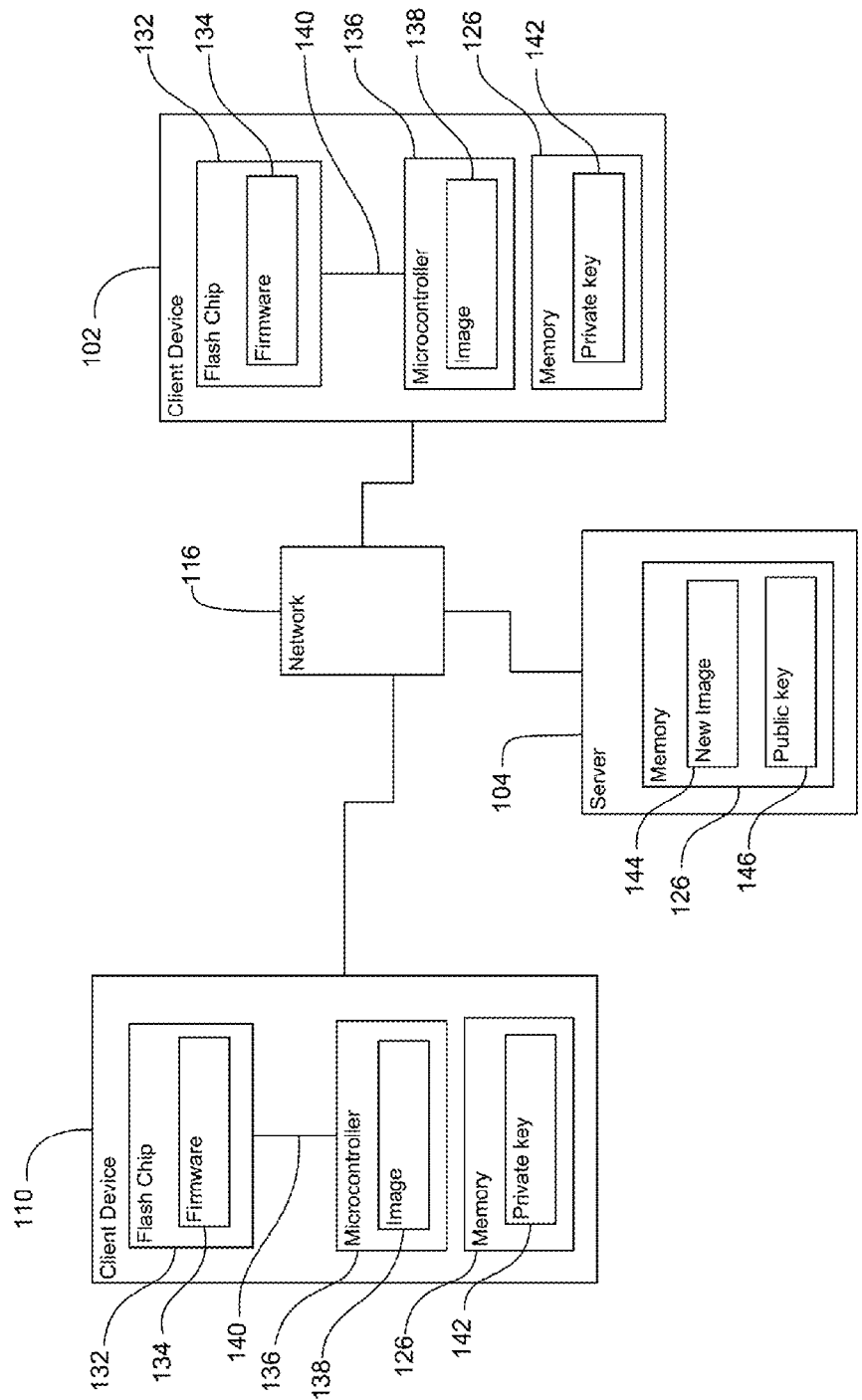
FIG. 3 illustrates a system for verifying the integrity of firmware and for updating the firmware in accordance with example implementations.

FIG. 3 illustrates a simplified version of FIG. 2 depicting a system for verifying the integrity of firmware and for updating the firmware. The system includes the server 104 in communication with client devices 102, 110 via the network 116. The flash chip 132 may be mounted on a motherboard of each client device 102, 110, and the flash chip 132 stores firmware 134 for the client device 102, 110. The flash chip 132 may be any type of non-volatile memory such as an EEPROM.

Each client device 102, 110 includes a microcontroller 136 that stores a image 138 in read-only memory such that the image 138 cannot be tampered with or otherwise modified. In some implementations, the microcontroller 136 may be mounted on the same motherboard as the flash chip 132. In other implementations, the microcontroller 136 may be provided external to the client device 102, 110. The flash chip 132 may be communicatively coupled to the microcontroller 136 by a bus 140 such as a serial peripheral bus. A private key 142 is stored in memory 126 of each client device 102, 100.

In some implementations, the flash chip 132 may be powered on and off independently of the client 102. The flash chip 132 may also be programmed to provide different classes of users with different levels of access. For example, some types of users (e.g., consumers) may not be allowed to edit or otherwise tamper with the flash chip 132, while other types of users (e.g., developers) may be allowed full access to modify the firmware provided on the flash chip 132.

The image 138 stored in the microcontroller 136 corresponds to a firmware version that is known to be an accurate representation due to, for example, the lack of user access to modify the image 138. Before the firmware 134 is executed to boot the client devices 102, 110, the microcontroller 136 communicates with the flash chip 132 to determine if the firmware 134 stored on the flash chip 132 is an accurate representation of the boot software for the client devices 102, 110. There may be many reasons that the boot software is incorrect, e.g., a virus, hacker tampering, outdated boot software, etc. The microcontroller 136 determines whether the firmware 134 is correct by comparing the firmware 134 to the image 138 which is known to correspond to an accurate representation of the firmware. While the entire image may be compared against the firmware, this is not required. In fact, the entire image need not be present in the microcontroller. For instance, a cryptographic hash of the image may be created and stored instead.

In the event that the firmware 134 stored on the flash chip 132 does not correspond to the image 138 stored on the microcontroller 136, the client devices 102, 110 are not booted. The microcontroller 136 may correct the errors in the firmware 134 by flashing the firmware 134 using the image 138. The firmware 134 is flashed by loading the contents of the image 138 onto the bus 140 such that the firmware 134 is overwritten with the image 138. After the firmware 134 is flashed, the client devices 102, 110 may then be booted using the firmware 134 that is now an accurate representation. In some implementations, the firmware 134 may be flashed with the image 138 every time that the client devices 102, 110 are powered up such that the firmware 134 is essentially locked to a particular value that corresponds to the value of the image 138.

The firmware 134 may require an update periodically. The update may seek to correct any bugs in the firmware 134, to support new hardware added to the client devices 102, 110, or to improve performance of the client devices 102, 110. A developer may upload a new image 126 to the server 104 for storage in its memory 126. The new image 144 includes the updates to be loaded to the flash chip 132 on the client devices 102, 110.

Either client device 102, 110 may initiate the update by requesting the update from the server 104. A request for the new image is generated at the requesting client device 102, 110 using the private key 142 stored in memory 126. The request, signed with the private key 142, is sent to the server 104 over the network 116. The server 104 authenticates the request using a public key 146 stored in its memory 126. After the request for the new image 144 is authenticated, the server 104 provides the new image 144 for output to the requesting client device 102, 110 over the network 116.

After the server 104 outputs the new image 144 to the requesting client device 102, 110, the microcontroller 136 checks that the new image 144 is properly authenticated. To authenticate the new image, the microcontroller 136 may perform a byte-by-byte comparison or a hash comparison between the same image 144 output from the server 104 and the image received at the requesting client device 102, 110. The authentication ensures that the image received at the requesting client device 102, 110 is the same image 144 output from the server 104. The authenticated, new image 144 is stored in memory of the microcontroller 136 such that the previously stored image 138 is overwritten with the updated firmware. The firmware 134 may then be re-flashed by providing the contents of the new image 144 on the bus 140 and overwriting the firmware 134 stored on the flash chip 132.

Figure 4:
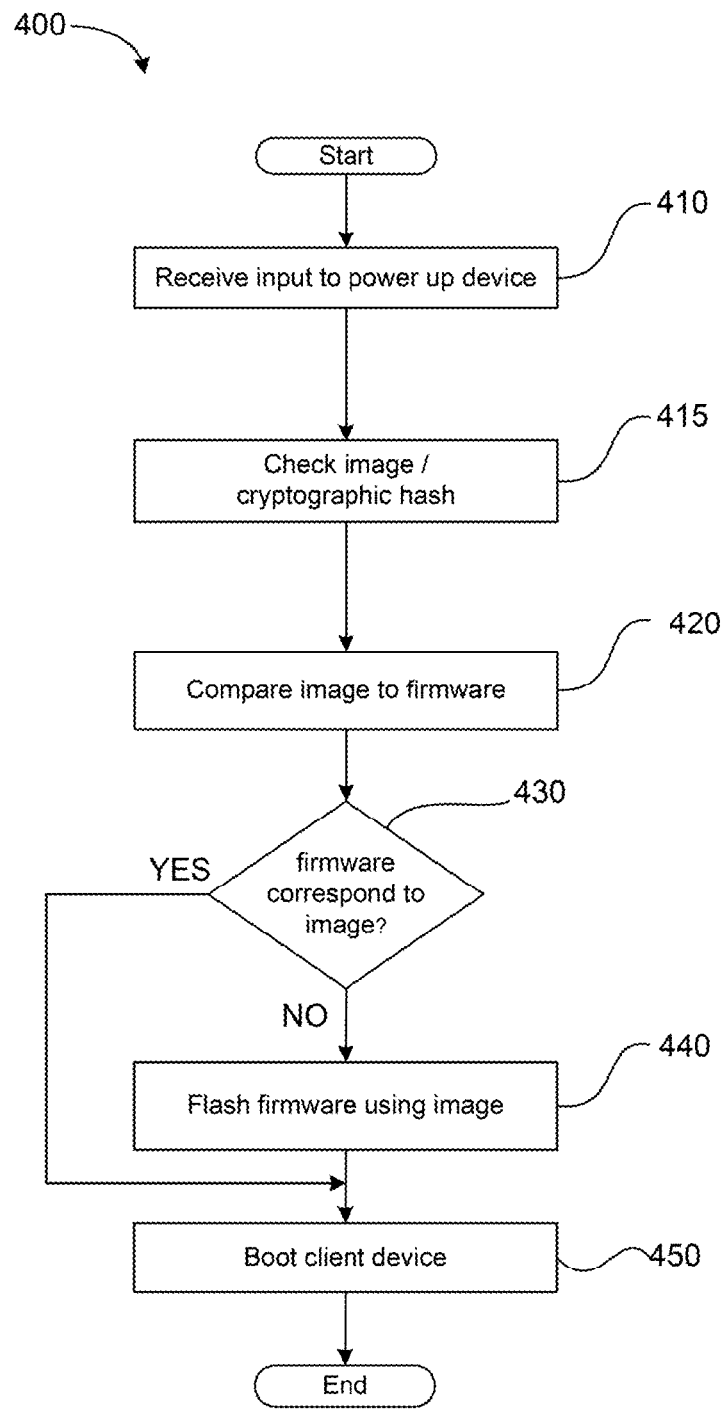
FIG. 4 illustrates a method for verifying the integrity of firmware in accordance with example implementations.

FIG. 4 illustrates a method 400 for ensuring firmware integrity. The method begins by receiving input to power-up a client device (block 410). The client device may be any type of computing device, e.g., a personal computer or a mobile computing device. The input may be received when user activates a power switch on the client device. The client device includes a flash chip for storing firmware and a microcontroller for storing an image in read-only memory. The image provides an accurate representation of the firmware. The read-only memory ensures that the image is not modified. As discussed above, the entire image need not be present in the microcontroller to perform the comparison. For example, a cryptographic hash of the image may be created and stored instead. The cryptographic hash thus corresponds to the image, and may be used for authentication purposes. For instance, the process may also include checking the cryptographic hash of the image to see if it was signed in a way that could be verified against a known good public key. This may be performed in block 415. The same could be done for an image maintained by a remote server, such as server 104 of FIG. 3. Assuming the check confirms that the image or hash is verified, the process continues as shown, otherwise, the process may terminate.

In response to activation of the power switch, the firmware stored on the flash chip of the client device is compared to the image stored in the read-only memory of the microcontroller of the client device (block 420). The flash chip is communicatively coupled to the microcontroller via a bus, e.g., a serial peripheral bus. The image may be provided to the flash chip over the bus. The image may then be compared to the firmware under control of the microcontroller of the client device.

A determination is made as to whether the firmware corresponds to the image (block 430). The firmware may be determined to correspond to the image when the image includes a representation of all of the features of the firmware, e.g., user settings, boot order, over locking speeds, etc. In the event that the firmware corresponds to the image, processing moves to block 450.

In the event that the firmware does not correspond to the image, the firmware is flashed using the image (block 440). Flashing the firmware is performed by overwriting the firmware stored on the flash chip with the image stored in the read-only memory of the microcontroller. The flashed firmware provides an accurate version of the on the flash chip. The client device may then be booted using the firmware without the risk of executing software that may have been tampered with or is otherwise not the most recent version (block 450). Processing then terminates.

Figure 5:
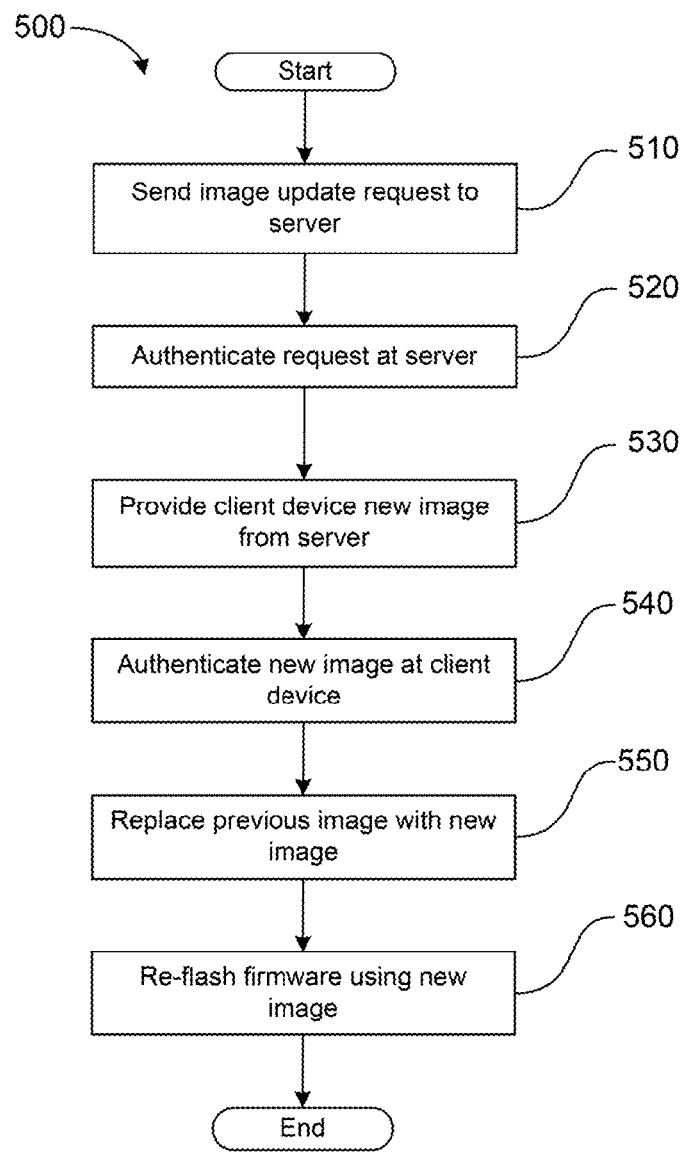
FIG. 5 illustrates a method for updating firmware in accordance with example implementations.

FIG. 5 illustrates a method 500 for updating firmware. The method begins when a client device sends an image update request to a server (block 510). The request may be sent in response to user action at the client device when the user intends to update the firmware. The request may also be sent automatically in response to a notification that a firmware update is available.

The request is authenticated at the server (block 520). The request for the firmware update may be authenticated using a private key from the client device that is sent with the request and then confirming the authenticity of the request at the server using a public key for the client device. Other known authentication procedures may be used to authenticate the firmware update request.

A new image is provided from the server to the client device (block 530). The new image may be provided to the client device by any number of known communication networks. For example, when the client device is a mobile computing device, the new image may be provided to the client device over a cellular network.

The new image is authenticated at the client device (block 540). The new image may be authenticated by performing a byte-by-byte comparison or a hash comparison between the image update stored on the server and the new image received at the client device. The comparison is performed to ensure that the image received at the client device is the same image that was output from the server in response to the firmware update request. In other words, the authentication determines whether the new image was tampered with during transmission from the server to the client device.

The previous version of the image stored in the read-only memory of the microcontroller of the client device is replaced with the new image (block 550). The new image is stored in the read-only memory of the microcontroller such that the new image cannot be modified while stored in the client device.

The firmware is then re-flashed using the new image (block 560). The re-flash of the firmware updates the firmware with the representation provided by the new image. The new representation of the firmware may be provided from the microcontroller to the flash chip via the bus provided between microcontroller and the flash chip. Processing then terminates.

As described above, execution of firmware that may have been improperly tampered with or is otherwise inaccurate is prevented. A client device includes a microcontroller that stores an image in read-only memory such that the image cannot be modified. The image corresponds to an accurate representation of the firmware for booting the client device. The firmware is stored on a flash chip provided in the client device. When the client device is powered but before the client device is booted, a determination is made as to whether the firmware stored on the flash chip corresponds to the image stored in the microcontroller. In the event that the firmware does not correspond to the image, the client device is not booted and the firmware is overwritten with the image. The client device may then be booted using an accurate version of the firmware. The firmware may be updated by receiving a new image from a server. The new image is stored in the read-only memory of the microcontroller of the client device such that the previously stored image is overwritten. The firmware on the flash chip may then be re-flashed using the new image.

Although the disclosure herein has been described with reference to particular implementations, it is to be understood that these implementations are merely illustrative of the principles and applications of the disclosure. It is therefore to be understood that numerous modifications may be made to the illustrative implementations and that other arrangements may be devised without departing from the spirit and scope as defined by the appended claims.

The invention claimed is:

1. A computer-implemented method for updating firmware, the method comprising:
    generating, with a processor, a firmware image update request using a private key associated with a client device;
    sending the image update request to a server;
    receiving a new firmware image from the server;
    replacing a firmware image stored in a microprocessor on the client device with the new firmware image received from the server; and
    flashing a flash chip including firmware using the new firmware image stored in the microprocessor such that the firmware is updated,
    wherein once the new firmware image is received from the server, the client device may not be booted until after flashing the flash chip, and
    thereafter, when the firmware is used to boot the client device, the flash chip is automatically flashed with the new firmware image.

2. The computer-implemented method of claim 1, wherein the new firmware image received from the server was uploaded to the server for storage.

3. The computer-implemented method of claim 1, further comprising authenticating the image update request using a public key associated with the client device.

4. The computer-implemented method of claim 1, further comprising authenticating to ensure that any new image received at the computing device corresponds to the new firmware image sent from the server.

5. A system for updating firmware, the system comprising:
    a flash chip for storing firmware;
    a microcontroller for storing a firmware image in read-only memory, wherein the microcontroller is configured to determine if the firmware stored on the flash chip corresponds to the firmware image prior to the firmware being used to boot a computing device;
    a bus for communicatively coupling the flash chip to the microcontroller; and
    a processor configured to:
    send a firmware image update request to a server;
    receive a new firmware image from the server;
    replace the image stored in the read-only memory of the microcontroller with the new firmware image received from the server;
    flash the flash chip using the new firmware image stored in the microcontroller received from the server such that the firmware is updated; and
    thereafter, when the firmware is used to boot the client device, the flash chip is automatically flashed with the new firmware image.

6. The system of claim 5, further comprising a memory for storing a private key associated with the client device, the processor being further configured to generate the image update request using the private key.

7. The system of claim 6, wherein the image update request is authenticated at the server using a public key associated with the client device.

8. The system of claim 5, wherein the processor is further configured to authenticate to ensure that any new image received at the computing device corresponds to the new firmware image sent from the server.

* * * * *